United States Patent [19]
Saotome et al.

[11] Patent Number: 5,007,544
[45] Date of Patent: Apr. 16, 1991

[54] MECHANISM FOR SUPPRESSING DISPLACEMENT OF TRAVELLING CRANE

[75] Inventors: Yoshimi Saotome, Takasago; Kiyotsuna Kuchiki; Norihiko Hayashi, both of Kakogawa, all of Japan

[73] Assignee: Kabushiki Kaisha Kobe Seiko Sho, Kobe, Japan

[21] Appl. No.: 505,401

[22] Filed: Apr. 6, 1990

[30] Foreign Application Priority Data

Sep. 9, 1989 [JP] Japan ................................ 1-234055

[51] Int. Cl.[5] ...................... B66C 23/26; B66C 13/06; F16D 31/62

[52] U.S. Cl. .................................... 212/265; 212/146; 212/182; 60/412; 91/437

[58] Field of Search ............... 212/146, 149, 152, 153, 212/157, 159, 182, 223, 230–232, 238, 255, 261, 264, 265; 91/437; 60/413–416

[56] References Cited

U.S. PATENT DOCUMENTS 3,814,265 6/1974 Miller ................................ 212/238
3,922,854 12/1975 Coeurderay .......................... 60/413
4,046,270 9/1977 Baron et al. .......................... 60/413
4,085,587 4/1978 Garlinghouse ........................ 60/413
4,142,368 3/1979 Mantegani ............................ 60/413
4,341,149 7/1982 Dezelan ................................ 60/416
4,367,673 1/1983 Krueck et al. ........................ 91/437
4,674,638 6/1987 Oliphant .............................. 212/182

*Primary Examiner*—Joseph F. Peters, Jr.
*Assistant Examiner*—R. B. Johnson
*Attorney, Agent, or Firm*—Oblon, Spivak, McClelland, Maier & Neustadt

[57] ABSTRACT

According to the displacement suppressing mechanism for a travelling crane of the present invention, when a mode selection switch selects an operation mode and a detected value by a boom position detecting means is smaller than a lower limit value of an appropriate travelling range, a change-over valve for replenishment capable of changing over the position of an auxiliary pressure oil source selectively to a communicating position for communication of the auxiliary pressure oil source with a first oil chamber of a boom raising and lowering hydraulic cylinder and a communication cutting-off position is shifted to the communicating position by a control means to supply a predetermined amount of pressure oil to the first oil chamber of the hydraulic cylinder.

4 Claims, 5 Drawing Sheets

MECHANISM FOR SUPPRESSING DISPLACEMENT OF TRAVELLING CRANE

BACKGROUND OF THE INVENTION

1. Field of the Invention

The present invention relates to a mechanism for suppressing the displacement or vibrations during travelling of a travelling crane such as a rough terrain crane or the like.

2. Description of the Prior Art

Travelling cranes are generally constructed as shown in FIG. 7, in which on a car body 2 which is supported by wheels 1 there is supported a boom 3 rotatably around a horizontal shaft 5 through a boom raising and lowering hydraulic cylinder 4. In such a travelling crane, when the car body 2 vibrates during travelling due to ruggedness of the road surface or due to sudden acceleration or deceleration, the boom 3 rocks vertically, so that the vibration of the car body 2 is enhanced and riding on the car body becomes less comfortable.

As an apparatus for suppressing such vibration during travelling there is known, for example, the apparatus disclosed in Japanese Patent Laid-Open No. 18295/1984. As shown in FIG. 8, this known apparatus is provided with a damping mechanism 19 in the interior of a boom raising and lowering hydraulic cylinder 18. Also provided are a counterbalance valve 12 in an oil path 13 connected to an oil chamber 181 which holds the load of the cylinder 18, as well as an electromagnetic change-over valve 16 and a shuttle valve 15 both disposed between the oil path 13 and an oil path 14 connected to both an oil path 17 and a direction control valve 11, the oil path 17 being connected to another oil chamber 182.

According to such known apparatus, during operation of the crane, when the direction control valve 11 is changed over to a boom UP position or DOWN position while the change-over valve is in "A" position, discharged oil from a pump 10 flows into the oil chamber 181 or 182 of the cylinder 18 to cause the cylinder 18 to be extended or withdrawn, whereby the boom is brought up or down. In travelling of the crane, the cylinder 18 is extended or retracted while the change-over valve 16 is held in "A" position to set the height from the ground up to the front end of the boom to an appropriate travelling height, and thereafter the change-over valve 16 is switched to "B" position, whereby the oil path 13 is brought into communication with the oil path 17 through both the change-over valve 16 and the shuttle valve 15, and the oil chambers 181, 182 and the damping mechanism 19 are communicated with each other to form a closed loop. Consequently, the load pressure acting on the oil chamber 181 of the cylinder 18 is conducted to an oil chamber 191 of the damping mechanism 19 and accumulated therein to exert a displacement suppressing action during travelling.

In travelling cranes of this type, in order that the displacement suppressing action may be exhibited effectively, it is necessary to set the height of the boom 3 a little higher than a bottom dead center $H_0$ and a litter lower than a height $H_3$ specified in the law in connection with travelling on general roads. More particularly, an appropriate height range of the boom 3 in travelling of the crane is from $H_1$ to $H_2$, provided $H_1 > H_0$ and $H_2 < H_3$. And it is necessary to maintain the boom height within that range.

In such conventional apparatus, however, even if the height of the boom 3 is set within the above appropriate travelling range of $H_1$ to $H_2$ in the initial state of travelling of the crane, subsequent drop of the oil temperature in the closed loop including the cylinder 18, that is, contraction of the oil, or unavoidable oil leakage with the lapse of the travelling time causes withdrawal of the cylinder 18, resulting in that the boom height becomes lower than the lower limit $H_1$ of the above appropriate travelling range and finally reaches the bottom dead center $H_0$, that is, the displacement suppressing action can no longer be exhibited. To avoid this, it is necessary for the operator to always check whether the height of the boom is within the appropriate travelling range of $H_1$ to $H_2$ or not. Thus, the operator cannot devote himself to the travelling operation, so his fatigue increases. Further, every time the height of the boom 3 becomes lower than the appropriate travelling range, it is necessary to change over the direction control valve 11 to extend or retract the cylinder 18, thereby raising or lowering the boom 3 for the adjustment of its height. But this operation is very troublesome. Besides, since the said adjustment of the height is not fully accurate, it is likely that the height of the boom 3 will exceed its limit height $H_3$.

SUMMARY OF THE INVENTION

It is the object of the present invention to eliminate the above-mentioned problems and provide a mechanism for suppressing the displacement of a travelling crane whereby, once the height of a boom is set to the appropriate travelling range at the time of travelling of the crane, even if thereafter a hydraulic cylinder withdraws and the boom goes down due to drop of the oil temperature and the resulting contraction of oil or due to unavoidable oil leakage, oil can be replenished to the cylinder automatically to raise the boom again up to a position within the appropriate travelling range, and the displacement suppressing action can be exhibited to a proper extent even during travelling of the crane over a long period without the necessity of the operator checking the height of the boom at all times, thus permitting the fatigue of the operator to be diminished.

In order to achieve the above-mentioned object, the mechanism for suppressing the displacement of a travelling crane according to the present invention is provided with a hydraulic cylinder for raising and lowering a boom, the hydraulic cylinder being connected between a car body of the travelling crane and the boom; a main hydraulic pump; a direction control valve for the supply and discharge of discharged oil from the main hydraulic pump selectively with respect to a first oil chamber which functions to maintain the load of the hydraulic cylinder and a second oil chamber formed on the side opposite to the first oil chamber; a displacement suppressing accumulator connected between the hydraulic cylinder and the direction control valve; a mode change-over valve mechanism capable of changing over from one to the other a travelling mode in which there is formed a closed loop with the first and second oil chambers and the accumulator being communicated with one another and an operation mode in which the said communication is cut off and pressure oil is supplied to or discharged from the first and the second oil chamber independently; a mode selection switch for selecting a mode for the mode change-over valve mechanism; a boom position detecting means; an auxiliary pressure oil source; a change-over valve for replenishment capable of changing over the position of the auxiliary pressure oil source selectively to a position in which the auxiliary pressure oil source is in communication with the first oil chamber of the cylinder and a position in which the said communication is cut off; and a control means which makes control to shift the change-over valve for replenishment to the communicating position and supply a predetermined amount of pressure oil to the first oil chamber of the hydraulic cylinder from the auxiliary pressure oil source when the selection switch selects the travelling mode and the detected value by the boom position detecting means is smaller than the lower limit value of the appropriate travelling range.

In the above construction there may be provided a control means which shifts the position of the change-over valve for replenishment to the communicating position when the selection switch selects the travelling mode and the detected value by the boom position detecting means is smaller than the lower limit value of the appropriate travelling range, and shifts the position of the said change-over valve to the cut-off position when the said detected value exceeds the upper limit value of the appropriate travelling range.

Also, there may be provided an accumulator for replenishment which accumulates oil in an amount required for increasing the internal pressure of the hydraulic cylinder to restore the height of the boom from the lower limit of the appropriate travelling range to a height within the same range, and also provided a control means which shifts the position of the change-over valve for replenishment to a communicating position for communication with the accumulator for replenishment when the selection switch selects the travelling mode and the detected value by the boom position detecting means is smaller than the lower limit value of the appropriate travelling range.

As the boom position detecting means there may be used a detector for detecting the length of the boom raising and lowering hydraulic cylinder.

In the above construction, if the boom is brought down to the bottom dead center and thereafter the mode selection switch is changed over to the travelling mode during travelling of the crane, the mode change-over valve mechanism is changed over to the travelling mode and the change-over valve for replenishment is changed over to the communicating position in accordance with a signal provided from the boom position detecting means; a predetermined amount of pressure oil is supplied to the closed loop from the auxiliary pressure oil source and is accumulated in the accumulator; and at the same time the pressure oil is fed to the first oil chamber of the hydraulic cylinder, whereby the cylinder is extended to raise the boom up to a height falling under the appropriate travelling range automatically. Thereafter, during travelling of the crane, in the event of withdrawal of the cylinder due to contraction of the oil caused by drop of the oil temperature in the closed loop or due to unavoidable oil leakage, the change-over valve for replenishment is operated in accordance with a signal provided from the boom position detecting means to replenish oil to the first oil chamber of the cylinder, whereby the cylinder is extended automatically up to a length falling under the appropriate travelling height and the height of the boom is restored to the same range automatically. Thus, the displacement suppressing action is exhibited always properly even during travelling over a long time.

Moreover, by the adoption of the control means which makes control to shift the change-over valve for replenishment to the cut off position when the detected value by the boom position detecting means exceeds the upper limit value, the supply of the pressure oil is stopped automatically and the height of the boom is restored to the height corresponding to the upper limit value of the appropriate travelling range automatically.

Further, by the use of the foregoing accumulator for replenishment, when the hydraulic cylinder is withdrawn, it is extended a required length merely by detecting the lower limit value of the appropriate travelling range and the height of the boom is restored to the upper limit value of the same range automatically. In this way the displacement suppressing action is exhibited properly.

DESCRIPTION OF PREFERRED EMBODIMENTS

Embodiments of the present invention will be described hereinunder with reference to the accompanying drawings.

Figure 1:
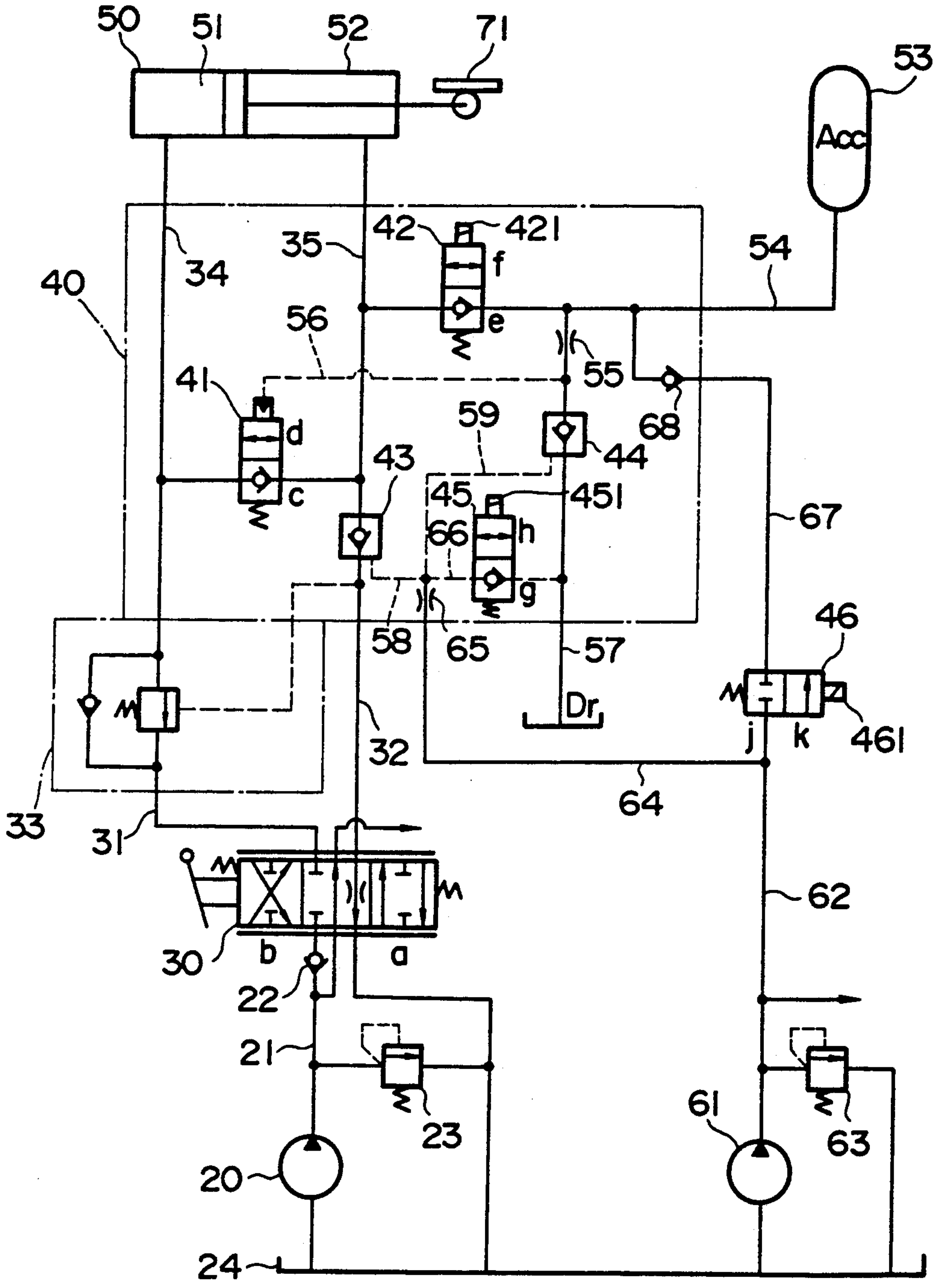
FIG. 1 is a hydraulic circuit diagram showing an embodiment of the present invention.
Figure 7:
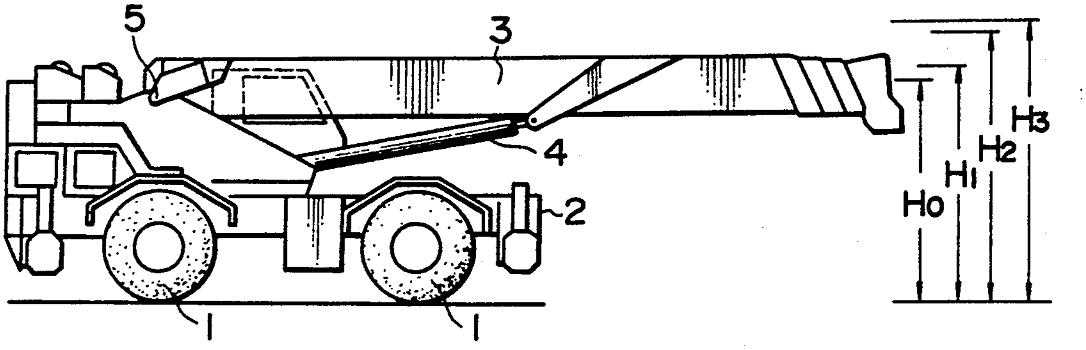
FIG. 7 is a side view of a travelling crane.
Figure 8:
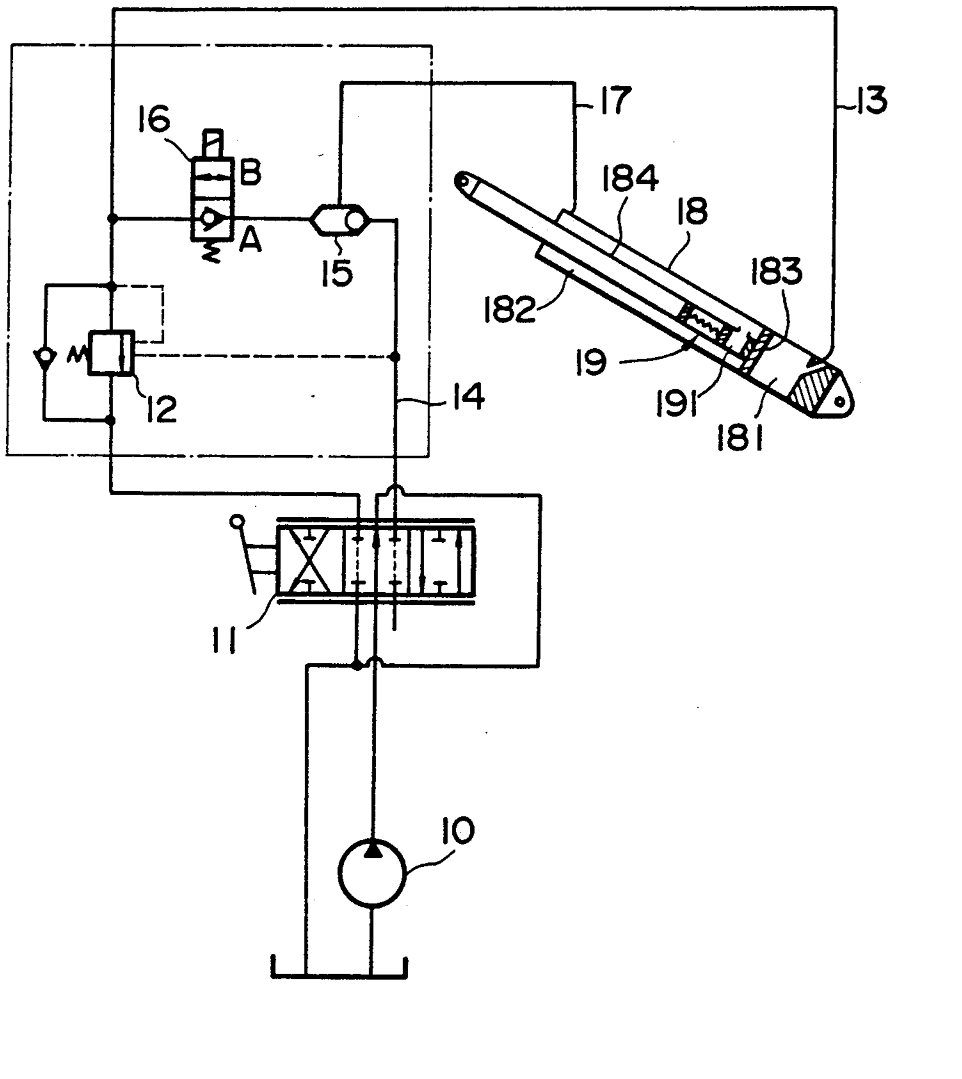
FIG. 8 (PRIOR ART)
FIG. 8 is a diagram of a conventional hydraulic circuit.

In FIG. 1, which illustrates an embodiment of the present invention, a check valve 22 and a main relief valve 23 are connected to a discharge-side oil path 21 of a main hydraulic pump 20. Further connected thereto is a boom raising and lowering hydraulic cylinder 50 (corresponding to the cylinder 4 in FIG. 7) through a direction control valve 30, oil paths 31, 32, a counterbalance valve 33 and a mode change-over valve mechanism 40.

The mode change-over valve mechanism 40 comprises valves 41, 42, 43, 44 and 45. The first change-over valve 41 is connected between an oil path 34 which is in communication with a first oil chamber, 51 of the cylinder 50 and an oil path 35 which is in communication with a second oil chamber 52 of the same cylinder. The valve 41 can be changed over selectively to a position c in which it shuts off the flow of oil from the oil path 34 to the oil path 35 and permits the reverse flow and position d in which both oil paths 34 and 35 are communicated with each other. The valve 41 is a pilot type valve having receiver portion, to which is inputted the accumulated pressure of the accumulator 53 through an accumulator oil path 54, a constriction 55 and a pilot oil path 56. When this accumulated pressure is lower than a preset pressure level, the change-over valve 41 is held in the position c, while when it is at the preset level or higher, the valve 41 is changed over to the position d.

The second change-over valve 42 can be changed over selectively to a position e in which it permits the flow of oil from the oil path 54 which is in communication with the accumulator 53 to the oil path 35 and shuts off the reverse flow and a position f in which both oil paths 35 and 54 are communicated with each other. The main pilot check valve 43 is disposed in a position in which it permits the flow of oil from the oil path 32 to the oil path 35 and shuts off the reverse flow. The auxiliary pilot check valve 44 is disposed in a position in which it shuts off the flow of oil from the oil path 54 to a drain oil path 57 and permits the reverse flow. Pilot oil paths 58 and 59 for opening the pilot check valves 43 and 44 are communicated with a discharge-side oil path 62 of an auxiliary hydraulic pump (auxiliary pressure oil source) 61 through a construction 65 and an oil path 64. The third change-over valve 45 can be changed over selectively to a position q in which it shuts off the flow of oil from a pilot oil path 66 communicated with the oil paths 58, 59 to the drain oil path 57 and a position h in which both oil paths 66 and 57 are communicated with each other.

The change-over valve 46 for replenishment, which is for the replenishment of oil to the accumulator 53 and the first oil chamber 51 of the cylinder 50, is disposed between the oil path 62 and an oil path 67 and can be changed over selectively to a position j to cut off the communication between both oil paths 62, 67 and a position k for communication of the two. The oil path 67 is in communication with the oil path 54 through a check valve 68. The check valve 68 may be provided in the position j within the change-over valve 46.

Figure 2:
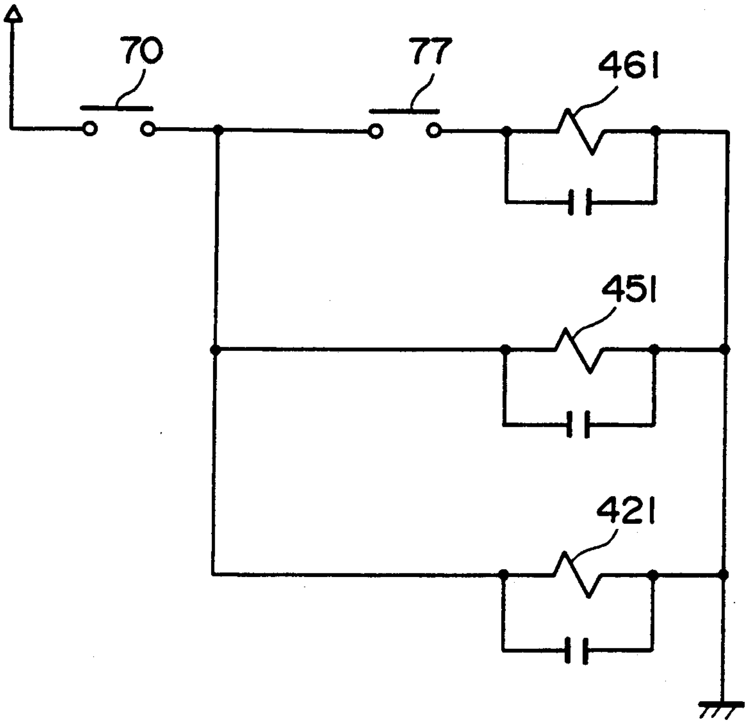
FIGS. 2 and 3 are diagrams of electric circuits used therein.
Figure 3:
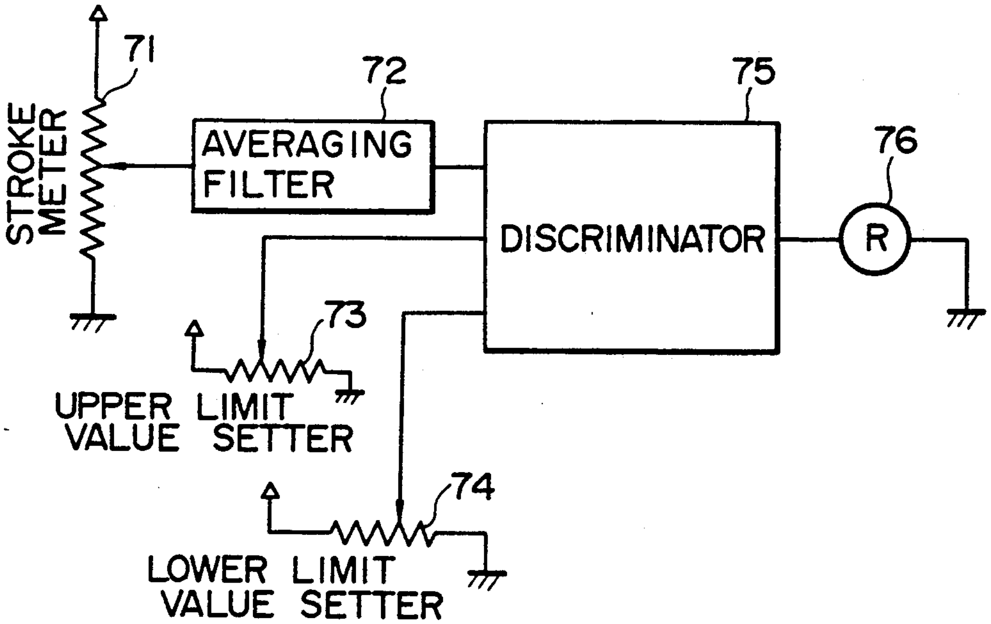

The change-over valves 42, 45 and 46 are electromagnetic change-over valves, which are controlled for change-over by the control means shown in FIGS. 2 and 3.

Referring to FIGS. 2 and 3, the numeral 70 denotes a damper switch (a mode selection switch), which is turned ON and OFF to select the travelling mode and the operation mode, respectively. As the boom position detecting means there may be used a detector which detects the angle of the boom 3, but in this embodiment there is used a stroke meter 71 which detects the length of the cylinder 50 shown in FIG. 7 and which is attached to the cylinder 50. Numeral 72 denotes an averaging filter, and numerals 73 and 74 denote an upper limit value setter and a lower limit value setter, respectively, whereby there are set upper and lower limit values of an appropriate travelling range with respect to the length of the cylinder 50 which values correspond to the boom heights $H_2$ and $H_1$. Numerals 75, 76 and 77 denote a discriminator, a relay and a contact of the relay 76, respectively. Numerals 421, 451 and 461 represent solenoids of the change-over valves 42, 45 and 46.

In performing the craning operation in the above construction, if the damper switch 70 is kept OFF (operation mode), the solenoids 421, 451 and 461 are deenergized and the change-over valves 42, 45 and 46 are held in the illustrated positions e, q and j, respectively, so that the pressure oil discharged from the auxiliary hydraulic pump 61 and regulated by an auxiliary relief valve 63 passes through the oil paths 62, 64 and the constriction 65 and enters the pilot oil paths 58, 59 to open the pilot check valves 43, 44. Since the accumulated pressure in the accumulator 53 is drained to a tank through the constriction 55 and the pilot check valve 44, the change-over valve 41 is held in the position c.

When in this state the direction control valve 30 is changed over to a boom UP position a, the discharged oil from the main hydraulic pump 20 passes through the counterbalance valve 33 and enters the first oil chamber 51 of the cylinder 50, whereby the cylinder is extended to raise the boom. At this time, the main pilot check valve 43 is opened, so with the extension of the cylinder 50 the oil discharged from the second oil chamber 52 passes through the pilot check valve 43, then through the direction control valve 30 and is returned to the tank 24. On the other hand, when the direction control valve 30 is changed over to a boom DOWN position b, the discharged oil from the pump 20 passes through the main pilot check valve 43 and enters the second oil chamber 52 reversely to the above. By this inflow pressure the counterbalance valve 33 is opened and the cylinder 50 is withdrawn while the oil in the first oil chamber 51 is returned to the tank 24, thereby lowering the boom.

On the other hand, for the travelling of the car, first a boom actuating hydraulic cylinder (not shown) is retracted in the operation mode to bring the boom 3 substantially into a most retracted state, and the boom 3 is brought down to the bottom dead center $H_0$ or thereabouts by retracting the boom raising and lowering hydraulic cylinder 50. Further, the suspended goods are removed and the crane hook (not shown) is retained for moderate movement to the car body 2.

Next, when the damper switch 70 is turned ON (operation mode), the solenoids 421 and 451 are energized to change over the positions of the change-over valves 42 and 45 to f and h, respectively. As a result, the oil path 54 is brought into communication with the oil path 35, while the pilot oil paths 58, 59 and 66 are communicated with the drain oil path 57, so that the pilot check valves 43 and 44 are closed. At the beginning of this change-over to the travelling mode, the accumulated pressure in the accumulator 53 is equal to the tank pressure and is below the preset pressure level, and the change-over valve 41 is held in the position c. Further, the cylinder 50 is in its most retracted state and the detected value by the stroke meter 71 is below the value set by the lower limit value setter 74, so an ON signal is outputted from the discriminator 75 and the relay 76 is energized to close the contact 77. Consequently, the solenoid 461 is energized and the change-over valve 46 is changed over to the position k. As a result, the discharged oil from the auxiliary hydraulic pump 61 passes through the check valve 68 and enters the accumulator 53. Thus, the oil pressure is accumulated gradually. On the other hand, the accumulated pressure in the accumulator 53 is conducted to the pilot oil path 56 through the constriction 55, and when it becomes the preset pressure level or higher, the change-over valve 41 is changed over to the position d- by that pressure, so that the oil paths 34 and 35 are communicated with each other to form a closed loop. Further, since the change-over valve 42 is in the position f, the accumulator 53 is brought into communication with the said closed loop.

When the change-over valve 41 is changed over to the position d, though not simultaneously, the discharged oil from the auxiliary hydraulic pump 61 passes through the position f and enters the oil path 35, then further passes the position c or d in the change-over valve 41 and enters the first oil chamber 51 of the cylinder 50. After the change-over valve 41 has been changed over to the position d, the discharged oil from the auxiliary hydraulic pump 61 enters the accumulator 53 and the above closed loop, whereby the cylinder 50 is extended in the same manner as in the case of a ram cylinder to raise the boom gradually from the bottom dead center $H_0$.

When the length of the cylinder 50 exceeds the upper limit value of the appropriate travelling range, the relay 76 is de-energized with a signal provided from the discriminator 75 to open the contact 77, whereby the solenoid 461 is de-energized and the change-over valve 46 is returned to the position j. As a result, the supply of the pressure oil from the auxiliary hydraulic pump 61 to the accumulator 53 and the cylinder 50 is stopped, the length of the cylinder 50 is set in the appropriate travelling length range, and the height of the boom 3 is set in the appropriate travelling height range of $H_1$ to $H_2$. Thus, by changing over the mode selection switch 70 to the travelling mode, the accumulation of pressure to the accumulator 53 and the adjustment of the height of the boom 3 are performed automatically.

Next, the car 1 is driven for travel by means of a driving unit (not shown). During this travel of the car 1, when the car body 2 vibrates due to ruggedness of the road surface or sudden acceleration or deceleration, the boom 3 rocks up and down, so that the cylinder 50 tends to extend or withdraw. At this time, since the oil chambers 51, 52 of the cylinder 50 and the accumulator 53 are in communication with each other, the change in pressure and the displacement of the boom 3 and that of the car body 2 which are caused by the extension or withdrawal of the cylinder 50 are suppressed by a vibration damping action induced by the accumulated pressure in the accumulator 53 and a damping action induced by pressure loss in the oil paths for example, whereby comfortableness is improved.

During travel of the car, the length of the cylinder 50 is detected by the stroke meter 71 and the detected value is compared with the values which have been set by the setters 73 and 74. At this time, even if the cylinder 50 withdraws very small strokes due to vibrations, the detected stroke values are averaged by the averaging filter 72 and the average value obtained is fed to the discriminator 75 and compared with the above set values. When the cylinder 50 withdraws gradually due to the contraction of oil caused by drop of the oil temperature in the foregoing closed loop or due to unavoidable oil leakage and the value detected by the stroke meter 71 becomes smaller than the value set by the lower limit value setter 74, the relay 76 is operated with a signal provided from the discriminator 75 to close the contact 77, so that the change-over valve 46 is changed over to the position k and the discharged oil from the auxiliary hydraulic pump 61 enters the above closed loop. At this time, since the boom 3 is in a low position and the stroke of the cylinder 50 is short, the internal pressure of the cylinder 50 scarcely changes. Therefore, the oil which entered the above closed loop does not enter the accumulator 53 but enters the first oil chamber 51 of the cylinder 50 to extend the cylinder. The length of the cylinder 50 is restored automatically to a length within the appropriate travelling length range and the height of the boom 3 also restored automatically to a height within the appropriate travelling range of $H_1$ to $H_2$.

Thus, since the height of the boom 3 is adjusted automatically to the appropriate range, it is not necessary for the operator to check the height of the boom 3 at all times; that is, the operator can devote all his energies to steering. Even during travel for a long time, the above displacement suppressing action can be exhibited properly.

Another embodiment of the present invention will be described below.

Figure 4:
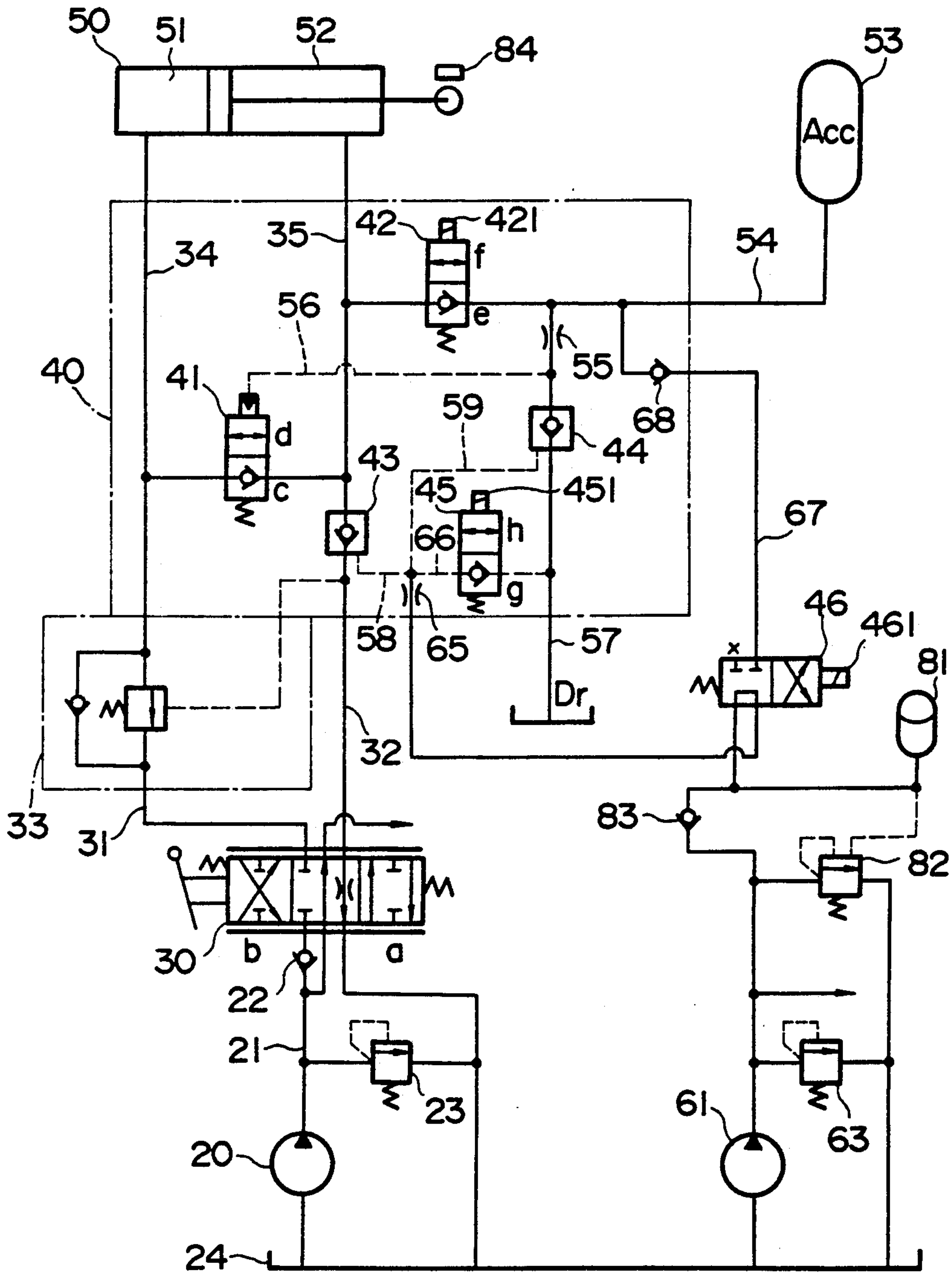
FIG. 4 is a hydraulic circuit diagram showing another embodiment of the present invention.

FIG. 4 illustrates an embodiment using an accumulator 81 for replenishment separately from the accumulator 53 for the suppression of vibration. In the accumulator 81 there is accumulated pressure oil in an amount (required amount) corresponding to the amount of oil fed to the first oil chamber 51 which amount is required from extending the cylinder 50 from the lower limit to the upper limit value of the appropriate travelling range. Numerals 82 and 83 denote an unloading relief valve and a check valve, respectively. A position detector 84 for detecting the lower limit value of the appropriate travelling range is attached to the cylinder 50. As the detector 84 there is used a limit switch or a proximity switch. Other constructional points are substantially the same as in the embodiment illustrated in FIG. 1.

In the embodiment illustrated in FIG. 4, during travel in the travelling mode, the displacement suppressing action is exhibited by the accumulated pressure in the displacement suppressing accumulator 53 as in the embodiment illustrated in FIG. 1. When during travel of the crane the cylinder 50 retracts due to oil leakage for example and the lower limit value is detected by the detector 84, the solenoid 461 is energized and the change-over valve 46 is changed over to the position k, so that the pressure oil in the replenishing accumulator 81 enters the closed loop including the cylinder 50 and flows into the first oil chamber 51 of the cylinder 50, whereby the cylinder 50 is extended automatically from the upper limit to the lower limit value of the appropriate travelling range, followed by exhibition of a predetermined displacement suppressing action.

According to this embodiment, the pressure oil is replenished from the replenishing accumulator 81 only in an amount necessary for extending the cylinder from the lower limit to the upper limit value of the appropriate travelling range, so even in the amount of error or trouble of the detector 84 there is no fear of the length of the cylinder 50 exceeding the upper limit value of the appropriate range.

Figure 5:
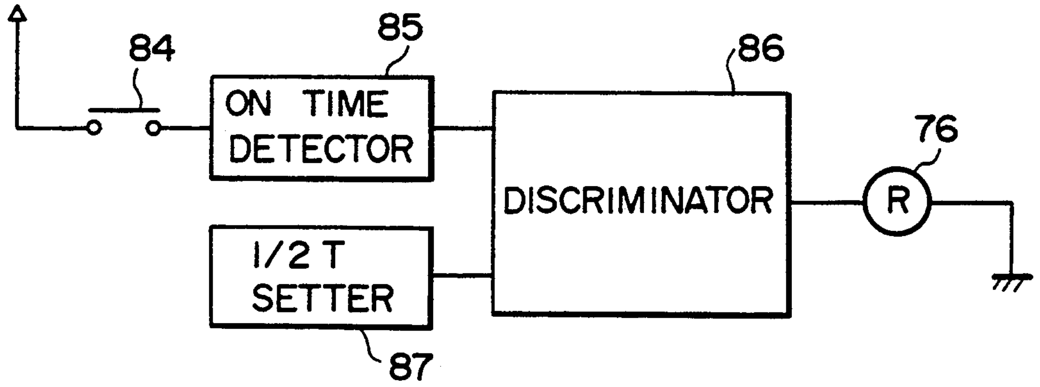
FIG. 5 is a diagram of an electric circuit used therein.

The position detector 84 may detect only the aforesaid lower limit value;. As the detector 84, therefore, there may be used a limit switch or a proximity switch. In the detection, the position detector 84 sometimes repeats on-off operation near the lower limit value due to vibrations during travel of the crane. Therefore, ON time of the position detector 84 is detected by a time detector 85 and is inputted to a discriminator 86, as shown in FIG. 5. On the other hand, a natural frequency of the cylinder 50 during travel of the crane is known and if the lower limit value is detected at time intervals of ½ or more of the period of the vibration waveform, it can be judged that the cylinder length is at its lower limit value. Therefore, ½ of time T calculated from the natural frequency of the cylinder 50 is set in a setter 87, and the relay 76 is operated, depending on whether the detected time by the time detector 85 is within the time (½T) thus set in the setter 87 or not, to energize the solenoid 461 for operation of the change-over valve 46. Thus, even when the position detector 84 performs on-off operation near the lower limit value, the change-over valve 46 is controlled on the basis of average values thereof, whereby it is possible to enhance controllability.

Figure 6:
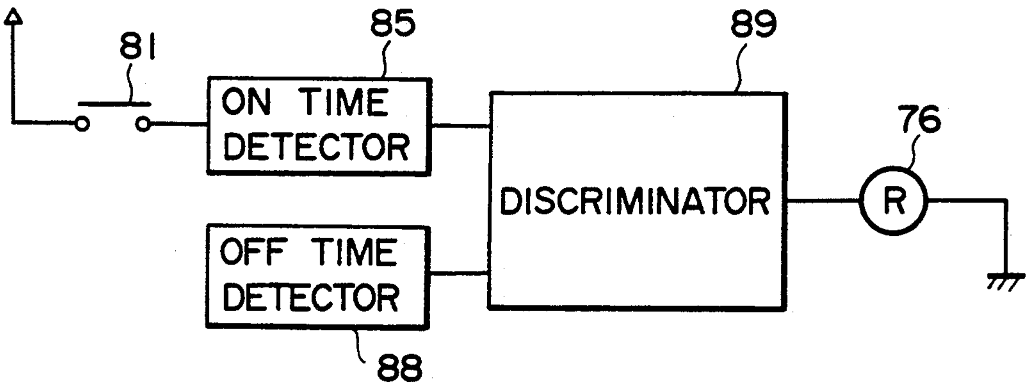
FIG. 6 is a diagram showing another example of an electric circuit used therein.

There may be used such another control means as shown in FIG. 6, in which ON time of the position detector 84 and OFF time thereof are detected by the detector 85 and a detector 88 and the detected values are fed to a discriminator 89, which in turn makes discrimination, uses the longer detected value of the two as an average value and actuates the relay 76 to energize the solenoid 461 for operation of the change-over valve 46.

In place of using the stroke meter in the embodiment of FIG. 1 there may be detected the upper and lower limit values of the appropriate travelling range of the cylinder 50 each individually and for each detected value there may be performed an averaging control using as a criterion ½ of the time T calculated from the natural frequency as shown in FIG. 5, or there may be performed an averaging control using ON time and OFF time as criteria as shown in FIG. 6.

According to the present invention, as set forth hereinabove, once the height of the boom is set in the appropriate travelling range during travel of the crane, even if thereafter the boom raising and lowering cylinder retracts due to the contraction of oil or unavoidable oil leakage during travel, the pressure oil from the auxiliary pressure oil source is supplied to the first oil chamber of the cylinder immediately to extend the cylinder, thereby restoring the boom to an appropriate height automatically and permitting a predetermined displacement suppressing action to be exhibited. Thus, even during travel of the crane over a long time, the displacement suppressing action can always be exhibited properly without the necessity of the operator checking the height of the boom at all times. Besides, it is not necessary to adjust the height of the boom during travel of the crane, that is, the operator can devote all his energies to steering, whereby the fatigue of the operator can be diminished to a great extent.

Moreover, by changing over the position of the change-over valve for replenishment to its communicating position when the height of the boom is below the lower limit value of the appropriate travelling range and by changing over the said position to the cut-off position when the boom height exceeds the upper limit value, the height of the boom can be restored to a height within the appropriate travelling height range.

Further, by using an accumulator for replenishment, even in the event of withdrawal of the cylinder during travel of the crane, it is possible to supply only a required amount of oil to the cylinder, and even in the event of error or trouble of the detector, the length of the cylinder does not exceed the upper limit value of the appropriate travelling length range nor is there a fear of the boom height exceeding the upper limit, and thus stability can be improved.

What is claimed is:

1. A mechanism for suppressing the displacement of a travelling crane, including:

- a wheeled supported car body; a boom pivotally supported on said car body;
- a hydraulic cylinder with first and second oil chambers for raising and lowering said boom, said hydraulic cylinder being connected between said body of the travelling crane and the boom;
- a main hydraulic pump;
- a direction control valve for controlling oil from said main hydraulic pump selectively with respect to said first oil chamber which functions to maintain the load of said hydraulic cylinder and to said second oil chamber located on the side opposite to said first oil chamber;
- a displacement suppressing accumulator connected between said cylinder and said direction control valve;
- a mode change-over valve mechanism selectively operable in either a crane travelling mode position in second oil chambers and said accumulator being in fluid communication with one another and a crane operation mode position in which said communication is cut off and pressure oil is supplied to or discharged from said first and second oil chambers independently;
- a mode selection switch for selecting a mode position for said mode change-over valve mechanism;
- a boom position detecting means;
- an auxiliary pressure oil source;
- a change-over valve for controlling said auxiliary pressure oil source, said change-over being selectively shiftable between a first position in which said auxiliary pressure oil source is in communication with said first oil chamber of said cylinder and to a second position to which said communication is cut off; and
- a control means operable to shift said change-over valve to said first position to supply a predetermined amount of oil to said first oil chamber of said cylinder from said auxiliary pressure oil source when said mode selection switch is in the crane travelling mode position and a detected value by said boom position detecting means is smaller than a predetermined lower limit value of a selected boom travelling range.

2. A displacement suppressing mechanism according to claim 1, including a control means for shifting a position of said change-over valve for replenishment to the communicating position when said selection switch selects the travelling mode and the detected value from said boom position detecting means is smaller than the lower limit value of the appropriate travelling range, and shifts the position of said change-over valve to the cut-off position when said detected value exceeds an upper limit value of the appropriate travelling range.

3. A displacement suppressing mechanism according to claim 1, including an accumulator for replenishment which accumulates oil in an amount required for increasing the internal pressure of said cylinder to restore the height of the boom from the lower limit of the appropriate travelling range to a height within the same range, and a control means which shifts the position of said change-over valve for replenishment to a communicating position for communication with said accumulator for replenishment when said selection switch selects the travelling mode and the detected value by said boom position detecting means is smaller than the lower limit value of the appropriate travelling range.

4. A displacement suppressing mechanism according to any of claims 1 or 2 or 3, wherein said boom position detecting means is a detector which detects a length of said boom raising and lowering hydraulic cylinder.

* * * * *